(12) United States Patent
Goldovskij

(10) Patent No.: US 12,423,686 B2
(45) Date of Patent: Sep. 23, 2025

(54) METHOD AND SYSTEM FOR CONDUCTING NON-FIAT CURRENCY TRANSACTIONS IN A CARD INFRASTRUCTURE

(71) Applicant: AKCIONERNOE OBSHCHESTVO "NACIONAL'NAYA SISTEMA PLATEZHNYKH KART", Moscow (RU)

(72) Inventor: Igor' Mihajlovich Goldovskij, Moscow (RU)

( * ) Notice: Subject to any disclaimer, the term of this patent is extended or adjusted under 35 U.S.C. 154(b) by 337 days.

(21) Appl. No.: 18/000,436

(22) PCT Filed: Apr. 28, 2021

(86) PCT No.: PCT/RU2021/000180
§ 371 (c)(1),
(2) Date: Apr. 20, 2023

(87) PCT Pub. No.: WO2021/246901
PCT Pub. Date: Dec. 9, 2021

(65) Prior Publication Data
US 2023/0281613 A1    Sep. 7, 2023

(30) Foreign Application Priority Data

Jun. 3, 2020  (RU) ................ RU2020118283A

(51) Int. Cl.
*G06Q 20/38* (2012.01)
*G06Q 20/40* (2012.01)
(Continued)

(52) U.S. Cl.
CPC ....... *G06Q 20/3825* (2013.01); *G06Q 20/381* (2013.01); *G06Q 20/3829* (2013.01);
(Continued)

(58) Field of Classification Search
CPC ............ G06Q 20/3825; G06Q 20/381; G06Q 20/3829; G06Q 20/401; G06Q 20/42; G06Q 2220/00; H04L 9/0825; H04L 9/3247

See application file for complete search history.

(56) References Cited

U.S. PATENT DOCUMENTS 11,354,665 B1 *  6/2022  Avetisov ............ G06Q 20/0655
12,136,073 B1 * 11/2024  Kurani ................. G06Q 20/10
(Continued)

FOREIGN PATENT DOCUMENTS

| WO | 2018102057 | 6/2018 |
| WO | 2019133578 | 7/2019 |
| WO | 2019139655 | 7/2019 |

OTHER PUBLICATIONS

Mikael Asplund, et al., In-Store Payments Using Bitcoin, Feb. 1, 2018, IEEE, pp. 1-6 (Year: 2018).*
(Continued)

*Primary Examiner* — Nilesh B Khatri
(74) *Attorney, Agent, or Firm* — Muncy, Geissler, Olds & Lowe, P.C.

(57) ABSTRACT

The invention pertains to the method and system for the performance of non-fiat currency transactions within the card infrastructure. The technical result is to increase the security of transactions. The method for the payment instrument for settlement in cryptocurrency involves encryption of a part of the cryptocurrency transaction signature, the encryption key of which is known only to the payment instrument and the issuer, transmission of data required for the authorization request generation, including the encrypted part of the cryptocurrency transaction signature, to the payment instruments acceptance point, where the authorization request is generated and sent to the acquirer host; this host sends the authorization request to the processing center (Continued)

of the payment system, which receives the number of the payment instrument for settlement in cryptocurrency; this number is used to generate the missing part of the cryptocurrency transaction signature and route the authorization request comprising both parts of the cryptocurrency transaction signature to the card issuer corresponding to this payment instrument number, where generation of the cryptocurrency transaction takes place, then this cryptocurrency transaction is sent to the issuer account in blockchain; this issuer sends a confirmation of crediting, and then submits a positive response to the authorization request to the acquirer host.

10 Claims, 2 Drawing Sheets

(51) Int. Cl.
*G06Q 20/42* (2012.01)
*H04L 9/08* (2006.01)
*H04L 9/32* (2006.01)

(52) U.S. Cl.
CPC .......... *G06Q 20/401* (2013.01); *G06Q 20/42* (2013.01); *H04L 9/0825* (2013.01); *H04L 9/3247* (2013.01); *G06Q 2220/00* (2013.01)

(56) References Cited

U.S. PATENT DOCUMENTS

| | | | |
|---|---|---|---|
| 2015/0170112 A1* | 6/2015 | DeCastro | G06Q 20/367 |
| | | | 705/39 |
| 2015/0324789 A1* | 11/2015 | Dvorak | H04L 9/3297 |
| | | | 705/67 |
| 2017/0357966 A1* | 12/2017 | Chandrasekhar | G06Q 20/06 |
| 2019/0156301 A1 | 5/2019 | Bentov et al. | |
| 2019/0220856 A1* | 7/2019 | Li | G06Q 20/40 |
| 2020/0027084 A1* | 1/2020 | Groarke | H04L 9/30 |
| 2021/0312431 A1* | 10/2021 | Ravinathan | G06Q 20/0658 |
| 2021/0350373 A1* | 11/2021 | Spalding | G06Q 20/381 |
| 2022/0020011 A1* | 1/2022 | Li | G06Q 20/10 |

OTHER PUBLICATIONS

PCT Application Serial No. PCT/RU2021/000180, International Search Report, Aug. 19, 2021, 1 page.

* cited by examiner

METHOD AND SYSTEM FOR CONDUCTING NON-FIAT CURRENCY TRANSACTIONS IN A CARD INFRASTRUCTURE

PERTINENT ART OF INVENTION

The invention pertains to bank payment systems, i.e. to cashless transactions performance within card payment systems with the use of non-fiat currencies as means of settlement and intended for enablement of cashless payments in non-fiat currency within standard card infrastructure for payment instruments acceptance.

BACKGROUND OF INVENTION

To date, there are fiat and non-fiat currencies: fiat currencies (fiat money) relate to the centralized payment system, i.e. nominal value of fiat currencies is set and guaranteed by the government, as for non-fiat currencies (non-fiat money), their internal settlement units count is kept by the fully-automated decentralized payment system. For the purposes of this invention, non-fiat currencies are understood to mean cryptocurrencies based on the blockchain technology.

Due to the expected spreading of low volatile cryptocurrencies such as TON, Libra, Central Bank Digital Currency, etc., the market shows interest in solving a task of use of non-fiat currencies in the existing card infrastructure of payment instruments acceptance. When introducing a new technology for the performance of transactions in card payment systems using non-fiat currencies (cryptocurrencies), the following challenge arises: it is insufficient for stores to introduce a new infrastructure for new payment instruments acceptance, as market sees few new payment instruments and their development is not as fast as issuers would like it to be simply because there are not many places where they can be used.

The suggested solution helps to eliminate the described technological gap and provides the possibility to use non-fiat currencies (cryptocurrencies) for purchase of goods in the current card infrastructure for payment instruments acceptance. Moreover, the solution does not require any modifications in the acquirers' software and hardware.

The method and system for the performance of transactions using cryptocurrencies are known in the art (USA application No. 2015170112, G06Q 20/00, G06Q 20/38, dd. 18.06.2015) and provide for the possibility to pay for the goods and (or) services using cryptocurrency at payment instruments acceptance points that do not accept cryptocurrency.

The downside of the solution is the need to introduce the adapted payment instruments acceptance points to ensure the possibility to accept and exchange cryptocurrency for purchase of goods and (or) services.

The closest analogous solution to the patentable invention is the method for cryptocurrency transaction performance (international application No. 2019139655, G06Q 20/36, G06Q 20/38, dd.18.07.2019) containing a payment instrument for settlement in cryptocurrency, a payment instrument acceptance point, an acquirer host, a payment system processing center, and an issuer in the payment instrument acceptance point of which payment instruments for settlement in cryptocurrency are accepted; data required for the authorization request generation are accepted from the payment instrument for settlement in cryptocurrency, then an authorization request is generated and submitted to the acquirer host; the said authorization request is accepted by the acquirer host and forwarded to the payment system processing center; the payment system processing center receives the authorization request and forwards it to the issuer; after that, the issuer submits an authorization request response indicating the cryptocurrency transaction authorization to the acquirer host.

The drawback of the closest analogous solution is the need to provide access to private keys of the payment instrument for settlement in cryptocurrency to a trusted party initiating the cryptocurrency transaction on behalf of a holder of the payment instrument for settlement in cryptocurrency.

INVENTION DISCLOSURE

The invention provides for the cryptocurrency transaction performance in the standard infrastructure for payment instruments acceptance in card payment systems and excludes the possibility of cryptocurrency transaction generation by a third party on behalf of the holder of the payment instrument for settlement in cryptocurrency. Therefore, the described solution allows the use of non-fiat currencies (cryptocurrencies based on the blockchain technology) for settlement in card payment systems without sacrificing the blockchain core principle: only a blockchain account owner can generate a cryptocurrency transaction from its blockchain account.

The main difficulty in implementation of the method and system for the performance of secure non-fiat currency transactions within the standard card infrastructure is the need to transfer more data to the issuer of the payment instrument for settlement in cryptocurrency as against a standard payment transaction. The known analogues solve the issue described above through modernization of infrastructure of the payment instrument acceptance point or permitting the third party to initiate the cryptocurrency transaction by the order of the holder of the payment instrument for settlement in cryptocurrency. Such approaches violate the blockchain core principle, i.e. blockchain transactions can only be initiated by the blockchain account owner. The suggested solution is implemented with the use of the standard infrastructure for payment instruments acceptance in card payment systems and prohibits card payment system participants from initiating cryptocurrency transactions in blockchain excluding the owner of the blockchain account from which cryptocurrency is transferred.

A technical challenge the suggested invention is trying to overcome is creation of the system and method allowing the holder of the payment instrument for settlement in cryptocurrency to solely initiate the cryptocurrency transaction using the standard infrastructure for card payment system transactions processing.

The technical result of the invention is improvement of security of the system and method for cryptocurrency transactions performance in the standard card infrastructure for transactions processing in card payment systems, expansion of payment instruments.

The specified technical result is achieved by the method for non-fiat currency transactions performance in the card infrastructure, containing a payment instrument for settlement in cryptocurrency, a payment instrument acceptance point, an acquirer host, a payment system processing center, and an issuer in the payment instrument acceptance point of which payment instruments for settlement in cryptocurrency are accepted; data required for the authorization request generation are accepted from the payment instrument for settlement in cryptocurrency, then an authorization request is generated and submitted to the acquirer host; the said authorization request is accepted by the acquirer host and forwarded to the payment system processing center; the payment system processing center receives the authorization request and forwards it to the issuer; after that, the issuer submits an authorization request response indicating the cryptocurrency transaction authorization to the acquirer host; in these conditions:

prior to submission of data required for the authorization request generation, a part of cryptocurrency transaction signature is encrypted in the payment instrument for settlement in cryptocurrency; a key for encryption of the signature part is known only to the payment instrument for settlement in cryptocurrency and the issuer; after that data required for the authorization request generation as well as the encrypted part of the cryptocurrency transaction signature are submitted to the point of payment instruments acceptance; the payment instruments acceptance point generates the authorization request and forwards it to the acquirer host; the acquirer host receives the authorization request and submits it to the payment system processing center;

the payment system processing center receives the authorization request from the acquirer host and obtains the number of the payment instrument for settlement in cryptocurrency through the acquirer host; this number is then used for generation of the missing part of the cryptocurrency transaction signature and routing of the authorization request comprising both parts of the cryptocurrency transaction signature to the card issuer relevant to this number of the payment instrument;

the issuer receives the above mentioned authorization request containing both parts of the cryptocurrency transaction signature from the payment system processing center and generates the cryptocurrency transaction, after that the said cryptocurrency transaction is sent to the issuer blockchain account; after receipt of the confirmation of cryptocurrency funds crediting to the issuer blockchain account, the issuer sends a positive response to the authorization request to the acquirer host.

In particular, prior to submission of data required for the authorization request generation, the amount of funds in cryptocurrency equivalent to the amount of purchase in fiat currency to be transferred to the issuer is defined based on the pre-agreed course on the payment instrument for settlement in cryptocurrency.

In particular, the issuer with its own blockchain account issues a payment instrument for settlement in cryptocurrency, the payment application of which contains an issuer BIN in the payment system.

In particular, the payment application installed in the payment instrument for settlement in cryptocurrency is used to prepare data for cryptocurrency transaction in blockchain, place data required for cryptocurrency transactions performance in tags used in standard responses to commands of payment instruments acceptance points, and respond to commands of payment instruments acceptance points.

In particular, during personalization, the issuer uploads public and private keys in the payment instrument for settlement in cryptocurrency, after that the public key is returned to the issuer.

For the purposes of the said technical result achievement, the system for non-fiat currency transactions performance in the card infrastructure is also suggested; this system comprises a payment instrument for settlement in cryptocurrency, a payment instrument acceptance point, an acquirer host, a processing center of the payment system and an issuer; the payment instrument acceptance point is configured to accept payment instruments for settlement in cryptocurrency, accept data required for the authorization request generation from the payment instruments for settlement in cryptocurrency, generate the authorization request and send it to the acquirer host; the acquirer host is configured to receive the above mentioned authorization request and submit it to the payment system processing center; the payment system processing center is configured to receive the authorization request and forward it to the issuer; the issuer is configured to receive the authorization request and submit the authorization request respond to the acquirer host with indication of the cryptocurrency transaction authorization. In this respect, the payment instrument for settlement in cryptocurrency is configured to encrypt and submit the encrypted part of the transaction signature to the payment instrument acceptance point; the signature encryption key is known only to the payment instrument for settlement in cryptocurrency and the issuer, the payment system processing center is configured to receive the number of the payment instrument for settlement in cryptocurrency through the acquirer host, use this number to generate the missing part of the cryptocurrency transaction signature and route the authorization request comprising both parts of the cryptocurrency transaction signature to the card issuer relevant to this number of the payment instrument;

the issuer is configured to receive the authorization request from the payment system processing center comprising both parts of the cryptocurrency transaction signature, generate the cryptocurrency transaction in blockchain after receipt of the said authorization request, submit the cryptocurrency transaction to the issuer blockchain account, receive the confirmation of cryptocurrency funds crediting to the issuer blockchain account, submit a positive response to the authorization request to the acquirer host.

In particular, prior to submission of data required for the authorization request generation, the amount of funds in cryptocurrency equivalent to the amount of purchase in fiat currency to be transferred to the issuer is defined based on the pre-agreed course on the payment instrument for settlement in cryptocurrency.

In particular, the issuer with its own blockchain account issues a payment instrument for settlement in cryptocurrency, the payment application of which contains an issuer BIN in the payment system.

In particular, the payment application installed in the payment instrument for settlement in cryptocurrency is used to prepare data for cryptocurrency transaction in blockchain, place data required for cryptocurrency transactions performance in tags used in standard responses to commands of payment instruments acceptance points, and respond to commands of payment instruments acceptance points.

In particular, during personalization, the issuer uploads public and private keys in the payment instrument for settlement in cryptocurrency and then sends the public key to the issuer.

Use of the payment instrument for settlement in cryptocurrency on which, prior to transfer of data required for the authorization request generation, a cryptocurrency transaction signature is generated and then data required for the authorization request generation, as well as a part of the cryptocurrency transaction signature, are submitted to the payment instrument acceptance point ensures the security of the method and system for cryptocurrency transaction performance in the card infrastructure, because the holder of the payment instrument for settlement in cryptocurrency does not grant access to cryptocurrency to third parties rather than solely initiates a cryptocurrency transaction. Expansion of payment instruments is also ensured through initiation of cryptocurrency transactions using the standard infrastructure for transactions processing in card payment systems.

Acceptance of the authorization request from the acquirer host by the payment system processing center, subsequent identification of the authorization request for cryptocurrency transaction using the number of the payment instrument for settlement in cryptocurrency, addition of the missing part of the cryptocurrency transaction signature to the above mentioned authorization request and further submission of this request comprising both parts of the cryptocurrency transaction signature to the issuer ensure the improvement of security of the system and method for cryptocurrency transactions performance in the card infrastructure; complementing of the authorization request allows the holder of the payment instrument for settlement in cryptocurrency to solely initiate the cryptocurrency transaction when the size of transferred data required for the cryptocurrency transaction generation is limited, as well as to submit the authorization request comprising both parts of the cryptocurrency transaction signature to the issuer without generation of the cryptocurrency transaction in the payment system processing center. Expansion of payment instruments is also ensured through enablement of performance of cryptocurrency transactions using the standard infrastructure for transactions processing in card payment systems.

Issuer's acceptance of the authorization request comprising both parts of the cryptocurrency transaction signature from the payment system processing center, subsequent generation of the cryptocurrency transaction and its forwarding to the issuer blockchain account, further receipt of the confirmation of cryptocurrency funds crediting to the issuer blockchain account, and submission by the issuer of a positive response to the authorization request to the acquirer host ensure the improvement of security of the system and method for cryptocurrency transactions performance in card infrastructure because, based on the received authorization request initiated by the holder of the payment instrument for settlement in cryptocurrency, such approach allows generation and processing of the cryptocurrency transaction and submission of the authorization request response to the acquirer host. Expansion of payment instruments is also ensured through enablement of cryptocurrency transactions generation by the issuer based on data generated in conditions of limitation of transferable data size in the standard infrastructure for transactions processing in card payment systems.

Due to the fact that, prior to transfer of data required for the authorization request generation on the payment instrument for settlement in cryptocurrency, the amount of funds in cryptocurrency equivalent to the amount of purchase in currency to be transferred to the issuer is defined based on the pre-agreed course, there is no need to include additional stages and participants (e.g. monetary exchanges) in the system; as funds from the account of the holder of the payment instrument for settlement in cryptocurrency are transferred directly to the issuer account on the basis of pre-agreed course, the security of the system and method for cryptocurrency transaction performance in the card infrastructure is ensured.

The issue by the issuer (with its own blockchain account) of the payment instrument for settlement in cryptocurrency the payment application of which contains the issuer BIN in the payment system ensures the possibility to determine the authorization request for cryptocurrency transaction using the number of the payment instrument for settlement in cryptocurrency and route it to the issuer at the stage of the authorization request processing by the processing center; this allows the holder of the payment instrument for settlement in cryptocurrency to solely initiate the cryptocurrency transaction when the size of data for the cryptocurrency transaction generation transferred in the standard infrastructure for transactions processing in card payment systems is limited; this additionally ensures the security of the described system and method and expands the payment instruments.

Use of the payment instrument for settlement in cryptocurrency with the payment application used to prepare data for cryptocurrency transaction in blockchain, place data required for cryptocurrency transactions performance in tags used in standard responses to commands of payment instruments acceptance points, and respond to commands of payment instruments acceptance points prevents third party's access to data of the holder of the payment instrument for settlement in cryptocurrency and ensures cryptocurrency transaction initiation solely by the account owner under limitation of size of data transferred via the standard infrastructure for transactions processing in card payment systems; this improves the security of cryptocurrency transactions performance and also expands the payment instruments, because data for subsequent generation of cryptocurrency transactions is transferred in the standard infrastructure for transactions processing in card payment systems.

Use of the payment instrument for settlement in cryptocurrency containing both public and private keys and submission of the public key to the issuer ensure the security of the system for cryptocurrency transaction performance using blockchain technology, because the owner of the payment instrument for settlement in cryptocurrency can solely initiate the cryptocurrency transaction using its own public and private keys and the issuer can generate the cryptocurrency transaction using public key. Expansion of payment instruments in the standard infrastructure for transactions processing in card payment systems is ensured due to initiation of cryptocurrency transactions using public and private keys and generation by the issuer of the cryptocurrency transaction using public key.

Below are the explanations of several terms used in the invention description.

The payment system acceptance point is a standard infrastructure for payment instruments acceptance in card payment systems with contact and or contactless data reading in card payment systems and may be a terminal of any type. For example, the payment system acceptance point may be configured as a standard infrastructure for cards acceptance such as a POS-terminal, terminal kernel and application, a protocol for connection of the terminal to the acquirer host.

The acquirer host is a system of the bank responsible for acceptance of payment instruments at the payment instrument acceptance point.

Issuer is a system of the bank issuing payment instruments including the payment instruments for settlement in cryptocurrency.

Standard commands of the payment instruments acceptance point are commands used by the payment instruments acceptance point for interaction with payment instruments in the existing infrastructure of transactions acceptance and processing in card payment systems. The payment instrument acceptance point in the described invention exchanges data with the payment instrument for settlement in cryptocurrency using standard commands used for payment instruments acceptance in the existing infrastructure for acceptance and processing of payment instruments in card payment systems.

The payment instrument is a bank card, a smartphone and/or any other instrument the use of which initiates funds transfer from the account of the holder of the payment instrument to the recipient account. A payment using the payment instrument can be performed in contact and/or contactless mode.

The payment instrument for settlement in cryptocurrency can be a bank card, a smartphone and/or any other instruments with the use of which the holder of the payment instrument for settlement in cryptocurrency can transfer cryptocurrency from its account to the recipient account via the blockchain technology. The payment instrument for settlement in cryptocurrency is issued by the issuer having its own blockchain account and willing to suggest cryptocurrency settlements to its clients. The payment application installed on the payment instrument for settlement in cryptocurrency contains issuer BIN in the payment system and communicates the payment instrument for settlement in cryptocurrency with the payment instruments acceptance point, as well as enables calculation of data to be submitted to the issuer of the payment instrument. The payment instrument for settlement in cryptocurrency is configured to receive standard commands from the payment instruments acceptance point, prepare data for cryptocurrency transactions performance, place data in tags of standard messages and send the said messages in response to commands from the payment instruments acceptance point.

HSM-device (hardware security module) is a physical computing device in the processing center of the payment system, that generates, stores and manages digital keys, as well as performs cryptographic calculations using keys.

The merchant is an economic entity selling goods, works or services.

The cryptocurrency transaction is a cryptocurrency funds transfer from the sender account to the recipient account using the blockchain technology (addition of a new cryptocurrency transaction block to the blockchain). For example, the invention description provides for the performance of the cryptocurrency transaction from the e-wallet of the holder of the payment instrument for settlement in cryptocurrency to the e-wallet of the issuer issuing the said payment instrument for settlement in cryptocurrency.

Confirmation of the cryptocurrency transaction shall be understood to mean a verification of the cryptocurrency transaction for compliance with the blockchain requirements.

Cryptocurrency transaction signature validation shall mean the transaction signature verification for compliance with the standard containing requirements to the transaction signature.

Dynamic transaction parameters shall mean a variable part of the transaction parameters. For example, dynamic transaction parameters include transaction size and transaction currency, merchant parameters, transaction signature. The transaction signature is a mandatory part of dynamic data.

Issuer BIN is a unique ID of the issuing bank that provides full information about the bank, is a part of PAN and used for bank identification within the card payment system during authorization, processing and clearing.

AES algorithm (Advanced Encryption Standard algorithm) is a symmetric algorithm of block encryption accepted as the encryption standard.

ODA (Offline Data Authentication) is a cryptographic authentication of card data in autonomous mode using public key.

ATC (Application Transaction Counter) is a counter of the payment system processing center that is incremented with every performed transaction.

Detailed description of the system for the performance of non-fiat currency transactions within the card infrastructure.

The owner of the wallet with cryptocurrency willing to pay for merchant's goods and services in cryptocurrency requests the issuer to issue a payment instrument for settlement in cryptocurrency for the owner of the wallet with cryptocurrency.

During personalization of the payment instrument for settlement in cryptocurrency, the issuer uploads information about the pre-agreed rates of exchange of cryptocurrency to fiat currencies (Russian rubles, USD, etc.) in the payment application of the payment instrument for settlement in cryptocurrency.

At the same time, the issuer uploads in the payment instrument for settlement in cryptocurrency the standard set of data used in standard EMV-application (EMV—Europay MasterCard Visa), including the unique number of the payment instrument for settlement in cryptocurrency, validity period of the payment instrument for settlement in cryptocurrency, AIP (Application Interchange Profile), keys for ODA (Offline Data Authentication), etc., as well as the issuer account in the blockchain.

Unique number of the payment instrument for settlement in cryptocurrency has a special prefix (issuer BIN)—first 6-8 digits of the payment instrument for settlement in cryptocurrency. The number with a specially allocated prefix assigned to the payment instrument for settlement in cryptocurrency allows routing the cryptocurrency transaction to the card issuer, and also informs the processing center of the payment system about the need to generate additional data for the transaction performance.

Also, during personalization on the payment instrument for settlement in cryptocurrency using blockchain technology, public and private keys are generated; these keys are required to generate the parameters required to calculate the transaction signature; after that the public key is returned to the issuer for storage in its database. The public key is required to the issuer to restore the cryptocurrency transaction signature and preliminary validate the cryptocurrency transaction signature by the issuer.

The transaction is initiated during interaction of the payment instrument for settlement in cryptocurrency and the payment instruments acceptance point. The payment application is installed on the payment instrument for settlement in cryptocurrency issued by the issuer; this application may receive standard commands with transaction parameters from the payment instruments acceptance point, generate cryptocurrency transaction data and place a part of cryptocurrency transaction data including a part of transaction signature in tags. The specified tags are used in standard messages sent by payment instruments in a standard way in response to standard commands from the payment instruments acceptance point. Therefore, a part of cryptocurrency transaction data is sent from the payment instrument for settlement in cryptocurrency to the payments instrument acceptance point in the standard format in accordance with the current protocols for banks connection to the card payment system.

The data exchange between the payment instrument for settlement in cryptocurrency and the payment instruments acceptance point occurs in a standard way and results in responses of the payment instrument for settlement in cryptocurrency to standard APDU commands of the terminal (Application Protocol Data Unit). Responses of the payment instrument for settlement in cryptocurrency are R-APDU messages containing data objects in TLV format (Tag Length Value) with tags standard for R-APDU (EMV standard commands) and relevant to APDU-commands of the terminal. Data transferred in tags from the payment instrument for settlement in cryptocurrency is required for the authorization request generation. EMV is a standard of interaction between IC cards ("chip cards") and IC-enabled POS terminals and automatic cash registers, and is used to authenticate payments with credit and debit payment instruments. EMV is an acronym for Europay, MasterCard and Visa, the developers of the standard.

Data required for the authorization request generation comprises dynamic data placed in tags generated by the payment instrument for settlement in cryptocurrency and submitted in responses to APDU-commands of the terminal. Dynamic parameters of the cryptocurrency transaction comprise the cryptocurrency transaction signature that consists of two parts: signature s and value r used for the cryptocurrency transaction signature validation. The signature s and value r used for the cryptocurrency transaction signature validation in binary representation are strings containing zeros and ones; each string is 32 bytes. For the performance of the cryptocurrency transaction by the issuer in blockchain, it is required to submit the cryptocurrency transaction signature comprised of two parts (32 bytes each) to the issuer from the payment instrument for settlement in cryptocurrency. Therefore, it is required to submit data of 64 bytes to the issuer.

However, the data transferred to the payment instruments acceptance point from the payment instrument for settlement in cryptocurrency is limited in size. The maximum size of dynamic data transferred from the payment instrument for settlement in cryptocurrency, which can be transferred to the issuer using the standard infrastructure for processing payment instruments in card payment systems, is 51 bytes.

The cryptocurrency transaction signature is a recalculable parameter of the cryptocurrency transaction and is a cryptographic transformation from the size and currency of the cryptocurrency transaction, the recipient account, and the sender's ID. There are different types of blockchain. To date, the blockchain uses different elliptic curves (secp256k1, ed25519, etc.) and different signature generation algorithms with the use of these curves (ECDSA, EdDSA, etc.) to create the signature. Still, all signatures have similar structure: (r, s). The value r is the coordinate (abscissa or ordinate) of the random point R of the cyclic subgroup of the group of points of the elliptic curve, and is used to verify the signature. The value r used for verification of the cryptocurrency transaction signature is an abscissa or ordinate of the random point R depending on the blockchain in use. The value s is the signature computed using the Schnorr or ElGamal algorithm in a subgroup of the multiplicative group of the field $GF(p)$ of prime order p. The signature s and the value r used to verify the cryptocurrency transaction signature are related to each other via this parameter that is a random number $k \in GF(p)$. For a random point R of an elliptic curve, the equality $R=kG$ is satisfied, where G is the generator of the cyclic subgroup of the group of points of the elliptic curve.

Since the size of data that needs to be transferred from the payment instrument for settlement in cryptocurrency to generate the authorization request is larger than the size of data that can be transferred from the payment instrument to the payment instruments acceptance point and then to the acquirer host, it is suggested to transfer not the entire data set from the payment instrument for settlement in cryptocurrency, but only the part containing dynamic parameters related to the performed transaction, that are available only to the application of the payment instrument for settlement in cryptocurrency.

The key for encrypting the value of the signature s, which is a part of the signature of the cryptocurrency transaction, is known only to the payment instrument for settlement in cryptocurrency and the issuer that issued the specified payment instrument for settlement in cryptocurrency. It follows that the parameter that is available only to the application of the payment instrument for settlement in cryptocurrency is the encrypted value of the signature s. Thus, the processing center of the payment system receives dynamic data comprising the encrypted signature s, but the processing center of the payment system does not know the value of the signature s at the time of the transactions performance. This improves the security of the system, since without the value of s at the processing center of the payment system, it is impossible to restore the cryptocurrency transaction signature.

The data required for the cryptocurrency transaction generation is transferred from the payment instrument for settlement in cryptocurrency to the payment instruments acceptance point. Then, the authorization request is generated at the payment instruments acceptance point and sent to the acquirer host. The acquirer host receives the authorization request and sends them it to the processing center of the payment system.

A part of the data required for the cryptocurrency transaction generation in the blockchain is contained in the authorization request accepted at the processing center of the payment system. The missing part of the data required for the cryptocurrency transaction generation in the blockchain is generated by the processing center of the payment system (the r value used for the cryptocurrency transaction signature verification) and stored in the issuer system (e.g., the public key of the payment application for settlement in cryptocurrency).

The processing center sends the said authorization request comprising data from the payment instrument for settlement in cryptocurrency and data generated by the processing center of the payment system for the cryptocurrency transaction performance in the blockchain to the issuer. Using the number of the payment instrument for settlement in cryptocurrency, the issuer determines the authorization request for the cryptocurrency transaction performance. The specified authorization request includes, among other things, two parts of the cryptocurrency transaction signature. Using the public key obtained during the personalization of the payment instrument for settlement in cryptocurrency, the issuer generates the cryptocurrency transaction in blockchain. After receiving the authorization request, the issuer restores the cryptocurrency transaction signature from the authorization request and preliminarily validates the cryptocurrency transaction signature. Then, if the cryptocurrency transaction signature validation result is positive, the issuer adds the transaction size, the issuer account in blockchain and the identifier of the holder of the payment instrument for settlement in cryptocurrency. After that, the issuer sends the cryptocurrency transaction to the issuer account in blockchain, then receives from the blockchain a confirmation that the funds in cryptocurrency equivalent to the purchase amount have been credited to the issuer account in blockchain; then, in the standard mode, the issuer sends a positive response to the authorization request to the acquirer host, indicating that the purchase has been approved.

Below, the invention is explained in drawings.

DETAILED DESCRIPTION OF THE IMPLEMENTATION OF THE CLAIMED TECHNICAL SOLUTION

Figure 1:
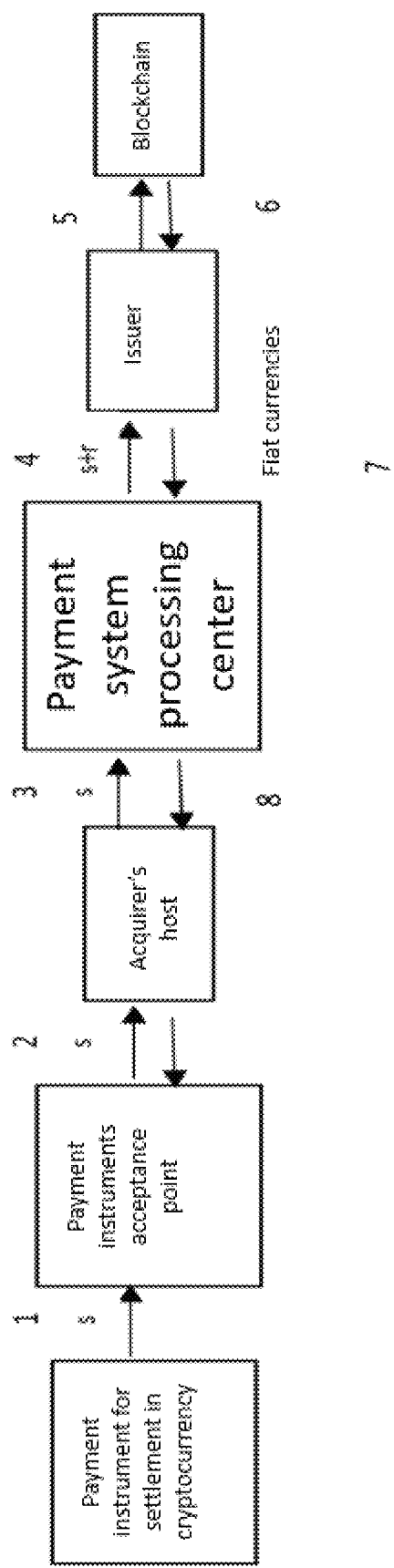
FIG. 1 shows a schematic representation of the claimed system for the performance of transactions of non-fiat currencies in the card infrastructure.
Figure 2:
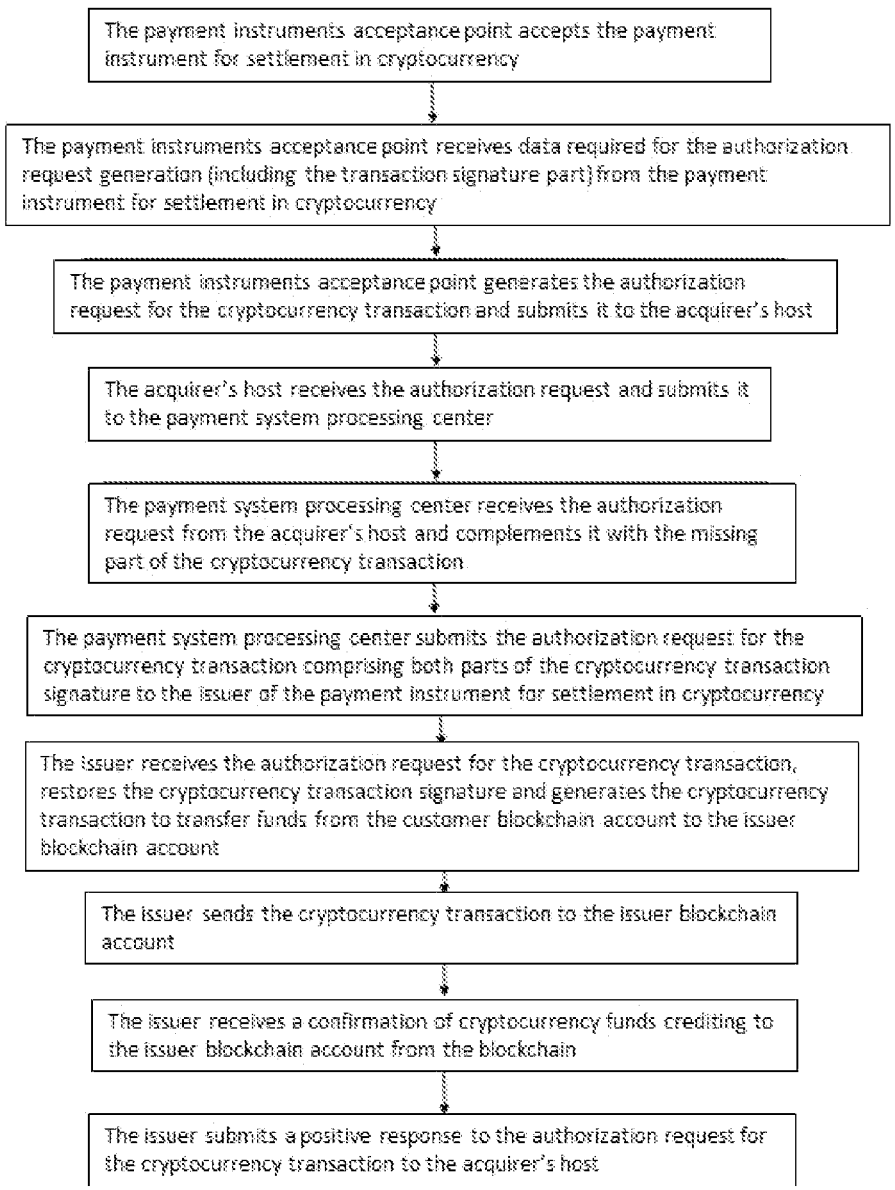
FIG. 2 shows a flowchart of the method for non-fiat currency transactions performance in the card infrastructure.

To initiate the transaction using the payment instrument for settlement in cryptocurrency, the payment instrument for settlement in cryptocurrency is accepted at the payment instruments acceptance point. Further, the payment instrument for settlement in cryptocurrency communicates with the payment instruments acceptance point in automatic mode; as a result, data required for the authorization request generation is transferred from the payment instrument for settlement in cryptocurrency to the payment instruments acceptance point. All commands and data objects mentioned in the description are defined in the EMV standard (commands and objects in the format of the Europay MasterCard Visa standard).

During the acceptance of the payment instrument for settlement in cryptocurrency at the payment instruments acceptance point, the payment instrument acceptance point selects the payment application for settlement in cryptocurrency with the use of blockchain technology in the payment instrument for settlement in cryptocurrency using the Select command by the standard AID (Application Identifier). Next, in the FCI Template object, PDOL (Processing Data Object List) containing the size and currency of the cryptocurrency transaction is read, and then GPO (Get Processing Options) command is sent to the payment instrument for settlement in cryptocurrency with the parameters of the cryptocurrency transaction requested by PDOL.

The payment instrument for settlement in cryptocurrency generates cryptocurrency transaction data, which includes dynamic data comprising the cryptocurrency transaction signature part, the size and currency of the cryptocurrency transaction, the recipient account, the sender ID, etc. In the payment instrument, a part of the cryptocurrency transaction signature is encrypted using the key for encryption of the signature value s.

Using the Read Record commands, the payment instruments acceptance point reads the following objects:
Track 2 Equivalent Data (Tag 57, 19 bytes)
PAN Sequence #(5F34, 1 byte)
Using Generate AC command the payment instruments acceptance point receives the following data:
ATC (9F36, 2 bytes)
ARQC (9F26, 8 bytes)
IAD (9F10, 32 bytes)
ICC Dynamic Number (9F4C, 8 bytes)

When exchanging data between the payment instrument for settlement in cryptocurrency and the payment instruments acceptance point, the encrypted value of the cryptocurrency transaction signature part (signature s) of 32 bytes is transferred from the payment instrument for settlement in cryptocurrency to the payment instruments acceptance point in the data field of the IAD object.

Data required for the cryptocurrency transaction generation is placed by the payment application of the payment instrument for settlement in cryptocurrency in tags and then transferred to the payment instruments acceptance point. After that, based on the data received from the payment instrument for settlement in cryptocurrency, the authorization request is generated at the payment instruments acceptance point and sent to the acquirer host.

The acquirer host automatically receives transaction data from the payment instruments acceptance point, processes authorization requests and sends them to the processing center of the payment system. Next, the acquirer host sends the authorization request comprising the following data generated by the payment instrument for settlement in cryptocurrency to the processing center of the payment system.

Track 2 Equivalent Data (Tag 57, 19 bytes)
PAN Sequence #(5F34, 1 byte)
ARQC (9F26, 8 bytes)
IAD (9F10, 32 bytes)

All of the listed data can be used to store a part of the cryptocurrency transaction signature. For example, a signature s of 32 bytes in size can be transferred in the data field of the IAD object. At the same time, only 10 bytes can be used in the Track 2 Equivalent Data object to transfer data to the issuer. Thus, the total amount of data transferred to the issuer by the payment instrument will be 51 bytes.

The processing center of the payment system automatically receives the authorization request containing data generated by the payment instrument for settlement in cryptocurrency from the acquirer host.

Upon receipt of the authorization request, the processing center of the payment system receives the data generated by the payment instrument for settlement in cryptocurrency, including a part of the cryptocurrency transaction signature (signature s) 32 bytes long. After that, the processing center of the payment system calculates the missing part of the cryptocurrency transaction signature–the value r used for verification of the cryptocurrency transaction signature.

Since the value r used for the cryptocurrency transaction signature verification, depending on the blockchain used, is the abscissa or ordinate of the random point R of the cyclic subgroup of the group of points of the elliptic curve, the value of the random point R of the cyclic subgroup of the group of points of the elliptic curve is calculated by the processing center of the payment system. For a random point R of the elliptic curve, the equality R=kG is satisfied, where G is the generator of the cyclic subgroup of the group of points of the elliptic curve, known by the processing center of the payment system, the parameter k is a random number. In this case, the processing center of the payment system can calculate the value of R, but cannot get the value of k in an explicit form. This is achieved by implementing a separate function for calculating the R point in the HSM device. The signature s and the value r used for the cryptocurrency transaction signature verification are related to each other through the specified parameter k.

To calculate the value of r used for the cryptocurrency transaction signature verification, the value of the specified parameter k is calculated by the processing center of the payment system. The value of the specified parameter k is calculated using the private key of 256 bits, known to the application of the payment instrument for settlement in cryptocurrency and to the HSM device of the processing center of the payment system by applying the AES algorithm first to the value of the cryptocurrency transaction counter ATC and then the additional value to the ATC. As a result of the concatenation of the obtained values, a binary representation of k of 256 bits will be obtained.

Then, the processing center of the payment system using the number of the payment instrument for settlement in cryptocurrency derives the key for generation of the specified parameter k and the value of the cryptocurrency transaction counter ATC. Knowing the value of the parameter k, the value r used for the cryptocurrency transaction signature verification is calculated. The r value used for the cryptocurrency transaction signature verification is the ordinate or abscissa of the R point depending on the blockchain used. The received value of r used for the cryptocurrency transaction signature verification is added to the specified authorization request. According to one of the invention implementations, a separate tag can be selected and this data object can be added to the FD-055 of message 0100 in order to transfer the value of r used for the cryptocurrency transaction signature verification.

After calculating the cryptocurrency transaction signature part, the processing center of the payment system sends the specified authorization request comprising both parts of the cryptocurrency transaction signature to the issuer.

The issuer automatically receives the authorization request from the processing center of the payment system and determines the authorization request for the cryptocurrency transaction using the number of the payment instrument for settlement in cryptocurrency. The specified authorization request includes, among other things, two parts of the cryptocurrency transaction signature. Using the public key obtained during the personalization of the payment instrument for settlement in cryptocurrency, the issuer generates the cryptocurrency transaction in blockchain. A cryptocurrency transaction in blockchain is generated as follows. After receiving the authorization request comprising both parts of the cryptocurrency transaction signature, the issuer restores the cryptocurrency transaction signature from the authorization request and preliminarily validates the cryptocurrency transaction signature. Then, if the cryptocurrency transaction signature validation result is positive, the issuer compliments the cryptocurrency transaction by adding the transaction size, the issuer account in blockchain and the identifier of the holder of the payment instrument for settlement in cryptocurrency. After that, the issuer sends the specified cryptocurrency transaction to the issuer account in blockchain.

After that, the issuer automatically receives from the blockchain a confirmation that the funds in cryptocurrency equivalent to the purchase amount have been credited to the issuer account in blockchain; then, in the standard mode, the issuer sends a positive response to the authorization request to the acquirer host, indicating that the purchase has been approved.

Thus, the suggested solution excludes the third-party's initiation of cryptocurrency transactions from the account of the owner of the payment instrument for settlement in cryptocurrency in the standard infrastructure for processing transactions in card payment systems; this increases the security of the system and method for non-fiat currency transactions performance in the card infrastructure and expands the payment instruments.

The invention claimed is:

1. The method for carrying out non-fiat currency transactions in a fiat currency infrastructure, wherein the fiat currency infrastructure comprises a payment instrument for settlement in cryptocurrency, a payment instrument acceptance point, an acquirer host, a payment system processing center, and an issuer in the payment instrument acceptance point of which payment instruments for settlement in cryptocurrency are accepted, the method comprising:
   accepting data required for generating an authorization request from the payment instrument for settlement in cryptocurrency;
   generating the authorization request and submitting the authorization request to the acquirer host;
   accepting the authorization request by the acquirer host and forwarding the authorization request to the payment system processing center;
   receiving the authorization request by the payment system processing center and forwarding the authorization request to the issuer;
   submitting an authorization request response by the issuer indicating a cryptocurrency transaction authorization to the acquirer host; wherein:
   prior to submission of the data required for generating the authorization request, encrypting a value of cryptocurrency transaction signature s, in the payment instrument for settlement in cryptocurrency,
   wherein the value of cryptocurrency transaction signature s is a part of the cryptocurrency transaction signature, and a key for encryption of the value of cryptocurrency transaction signature s is known exclusively to the payment instrument for settlement in cryptocurrency and the issuer,
   submitting data required for generating the authorization request and the value of cryptocurrency transaction signature s to the payment instrument acceptance point;
   generating by the payment instrument acceptance point the authorization request and forwarding the authorization request to the acquirer host;
   receiving the authorization request by the acquirer host and submitting the authorization request it to the payment system processing center;
   receiving by the payment system processing center the authorization request from the acquirer host and obtaining a number of the payment instrument for settlement in cryptocurrency through the acquirer host;
   generating a second value of the cryptocurrency transaction signature r using the number of the payment instrument for settlement in cryptocurrency and routing the authorization request comprising both parts of the cryptocurrency transaction signature s and r to the issuer associated with the number of the payment instrument for settlement in cryptocurrency;
   receiving by the issuer the authorization request comprising both parts of the cryptocurrency transaction signature s and r from the payment system processing center and generating the cryptocurrency transaction;
   sending the cryptocurrency transaction to an issuer blockchain account;
   after receipt of a confirmation of cryptocurrency funds crediting to the issuer blockchain account, sending by the issuer a verification response to the authorization request to the acquirer host.

2. The method according to claim 1, wherein prior to submitting data required for generating the authorization request, the amount of funds in cryptocurrency equivalent to the amount of purchase in fiat currency to be transferred to the issuer is defined based on a pre-agreed course on the payment instrument for settlement in cryptocurrency.

3. The method according to claim 1, wherein the method further comprises the issuer issuing the payment instrument for settlement in cryptocurrency, the payment application of which contains the issuer's bank identification number (BIN) in the payment system.

4. The method according to claim 1, wherein the method further comprises the payment application installed in the payment instrument for settlement in cryptocurrency generating data for cryptocurrency transaction in blockchain, placing data required for cryptocurrency transactions performance in tags used in responses to commands of payment instruments acceptance points, and responding to commands of payment instruments acceptance points.

5. The method according to claim 1, wherein the method further comprises the issuer uploading the public and private keys to the payment instrument for settlement in cryptocurrency during personalization, and the payment instrument for settlement in cryptocurrency sending the public key to the issuer.

6. A system for carrying out non-fiat currency transactions in a fiat currency infrastructure, wherein the system comprises: a payment instrument for settlement in cryptocurrency, a payment instrument acceptance computer, an acquirer host computer, a payment system computer processing center, and an issuer computer;

wherein the payment instrument acceptance computer is configured to:

accept payment instruments for settlement in cryptocurrency;

accept data required for generating the authorization request from the payment instruments for settlement in cryptocurrency;

generate the authorization request and send the authorization request to the acquirer host computer;

wherein the acquirer host computer is configured to:

receive the authorization request and submit authorization request to the payment system computer processing center;

wherein the payment system computer processing center is configured to receive the authorization request and forward authorization request to the issuer computer;

wherein the issuer computer is configured to receive the authorization request and submit an authorization request response to the acquirer host computer with a cryptocurrency transaction authorization;

wherein the payment instrument for settlement in cryptocurrency is configured to encrypt and submit value of cryptocurrency transaction signature s to the payment instrument acceptance computer, wherein a key for the value of cryptocurrency transaction signature s is known exclusively to the payment instrument for settlement in cryptocurrency and the issuer computer;

wherein the payment system computer processing center is configured to:

receive the number of the payment instrument for settlement in cryptocurrency through the acquirer host computer, use the number of the payment instrument for settlement in cryptocurrency to generate a second value of the cryptocurrency transaction signature r and route the authorization request comprising both parts of the cryptocurrency transaction signature s and r to the issuer computer associated with the number of the payment instrument for settlement in cryptocurrency; and wherein the issuer computer is configured to:

receive the authorization request from the payment system computer processing center comprising both parts of the cryptocurrency transaction signature s and r, generate the cryptocurrency transaction in blockchain after receipt of the authorization request, submit the cryptocurrency transaction to an issuer blockchain account, receive a confirmation of cryptocurrency funds crediting to the issuer blockchain account, and submit a verification response to the authorization request to the acquirer host computer.

7. The system according to claim 6, wherein prior to the submission of data required for the authorization request generation, an amount of funds in cryptocurrency equivalent to the amount of purchase in fiat currency to be transferred to the issuer computer is defined based on a pre-agreed course on the payment instrument for settlement in cryptocurrency.

8. The system according to claim 6, wherein the issuer computer is configured to issue a payment instrument for settlement in cryptocurrency, the payment application of which contains the issuer's bank identification number (BIN) in the payment system.

9. The system according to claim 6, wherein the payment application installed in the payment instrument for settlement in cryptocurrency is configured to prepare data for cryptocurrency transaction in blockchain, place data required for cryptocurrency transactions performance in tags used in responses to commands of payment instruments acceptance computers, and respond to commands of payment instruments acceptance computers.

10. The system according to claim 6, wherein the issuer computer is configured to upload the public and private keys to the payment instrument for settlements in cryptocurrency during personalization, and wherein the payment instrument for settlement in cryptocurrency is configured to send the public key to the issuer computer.

* * * * *